US011629517B2

(12) United States Patent
Yamazaki et al.

(10) Patent No.: US 11,629,517 B2
(45) Date of Patent: Apr. 18, 2023

(54) SLIDING SEISMIC ISOLATION DEVICE

(71) Applicants: NIPPON STEEL ENGINEERING CO., LTD., Tokyo (JP); TORAY INDUSTRIES, INC., Tokyo (JP)

(72) Inventors: Shinsuke Yamazaki, Tokyo (JP); Tadayuki Noro, Tokyo (JP); Yoshinao Konishi, Tokyo (JP); Atsushi Watanabe, Tokyo (JP); Koji Nishimoto, Tokyo (JP); Masato Sekiyama, Shiga (JP); Yuki Ninomiya, Shiga (JP); Masaru Harada, Shiga (JP)

(73) Assignees: NIPPON STEEL ENGINEERING CO., LTD., Tokyo (JP); TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 17/596,234

(22) PCT Filed: Oct. 27, 2020

(86) PCT No.: PCT/JP2020/040188
§ 371 (c)(1),
(2) Date: Dec. 6, 2021

(87) PCT Pub. No.: WO2021/124686
PCT Pub. Date: Jun. 24, 2021

(65) Prior Publication Data
US 2022/0145655 A1 May 12, 2022

(30) Foreign Application Priority Data
Dec. 20, 2019 (JP) .............................. JP2019-230625

(51) Int. Cl.
*E04H 9/02* (2006.01)
*D03D 13/00* (2006.01)
(Continued)

(52) U.S. Cl.
CPC ............. *E04H 9/021* (2013.01); *B32B 5/024* (2013.01); *B32B 15/14* (2013.01); *D03D 13/00* (2013.01);
(Continued)

(58) Field of Classification Search
None
See application file for complete search history.

(56) References Cited

U.S. PATENT DOCUMENTS

| 2001/0039305 A1 | 11/2001 | Nakamaru et al. |
| 2014/0291475 A1 | 10/2014 | Hubbard et al. |

(Continued)

FOREIGN PATENT DOCUMENTS

| CN | 103572454 | 2/2014 |
| CN | 104487734 | 4/2015 |

(Continued)

OTHER PUBLICATIONS

International Search Report dated Dec. 1, 2020 with respect to No. PCT/JP2020/040188.

*Primary Examiner* — Shawn McKinnon
(74) *Attorney, Agent, or Firm* — IPUSA, PLLC

(57) ABSTRACT

A sliding seismic isolation device includes a structure fixation plate having a first sliding surface and a metallic slider having a second sliding surface contacting the first sliding surface. A friction member composed of a single-layer fabric is attached to the first sliding surface, the second sliding surface, or both of the first sliding surface and the second sliding surface. One of a warp and a weft is formed of multiple plied yarns into which high-strength fibers and PTFE fibers are twisted together and the other of the warp and the weft is formed of multiple high-strength fibers in the single-layer fabric. The single-layer fabric has a twill weave and is woven such that the plied yarns of the one forming the (Continued)

single-layer fabric are exposed at a surface opposite from the attachment side of the friction member more than the high-strength fibers of the other forming the single-layer fabric.

3 Claims, 7 Drawing Sheets

(51) Int. Cl.
    *D03D 15/283* (2021.01)
    *B32B 5/02* (2006.01)
    *B32B 15/14* (2006.01)
    *F16F 7/08* (2006.01)

(52) U.S. Cl.
    CPC ......... *D03D 13/004* (2013.01); *D03D 15/283* (2021.01); *F16F 7/08* (2013.01); *B32B 2262/0238* (2013.01); *D10B 2321/042* (2013.01); *D10B 2331/04* (2013.01); *D10B 2331/14* (2013.01); *D10B 2331/301* (2013.01); *D10B 2505/00* (2013.01)

(56) References Cited

U.S. PATENT DOCUMENTS

| | | |
|---|---|---|
| 2016/0215495 A1 | 7/2016 | Nakamura et al. |
| 2018/0223903 A1 | 8/2018 | Zhang et al. |
| 2020/0141148 A1 | 5/2020 | Wakita et al. |

FOREIGN PATENT DOCUMENTS

| | | |
|---|---|---|
| CN | 109247024 | 1/2019 |
| JP | 2000-104731 | 4/2000 |
| JP | 2005-220487 | 8/2005 |
| JP | 2010-054050 | 3/2010 |
| JP | 5521096 | 6/2014 |
| JP | 2018-525542 | 9/2018 |
| TW | 201315874 | 4/2013 |
| TW | 201443321 | 11/2014 |
| TW | 201636482 | 10/2016 |
| TW | I658219 | 5/2019 |
| WO | 2013/003614 | 1/2013 |

SLIDING SEISMIC ISOLATION DEVICE

TECHNICAL FIELD

The present disclosure relates to sliding seismic isolation devices.

BACKGROUND ART

In earthquake-prone countries, various earthquake resistant techniques, seismic isolation techniques, and seismic control techniques, such as techniques against seismic force and techniques for reducing seismic force to enter structures, have been developed for various structures such as buildings, bridges, elevated roads, and single-family houses, and have been applied to various structures. In particular, seismic isolation techniques, which are techniques to reduce seismic force to enter structures itself, effectively reduce the vibrations of structures at the time of earthquakes. In summary, the seismic isolation techniques interpose a seismic isolation device between a base that is a substructure and a superstructure to reduce vibrations of the base due to an earthquake transmitted to the superstructure, thereby reducing vibrations of the superstructure to ensure its structural stability. This seismic isolation device is effective not only in the case of earthquakes but also in reducing the effect of traffic vibrations constantly acting on structures over the superstructure.

There are various forms of seismic isolation devices, such as laminated rubber bearing devices with a lead plug, high damping laminated rubber bearing devices, devices combining a laminated rubber bearing and a dumper, and sliding seismic isolation devices, among which the sliding seismic isolation devices include flat sliding seismic isolation devices and spherical sliding seismic isolation devices. The flat sliding seismic isolation devices do not have restoring force, while the spherical sliding seismic isolation devices have restoring force to have a self-centering function in the event of earthquakes. According to conventional sliding seismic isolation devices, the reference bearing stress of interposing Teflon (registered trademark) or the like in the devices is 20 N/mm$^2$ (20 MPa). Therefore, in case the load weight increases because of an increase in the height of a structure or the like, the sliding seismic isolation devices have to increase in size to have planar dimensions that match this load. Therefore, the sliding seismic isolation devices are lower in cost competitiveness and are consequently less frequently used than different types of seismic isolation devices such as laminated rubber seismic isolation devices.

Therefore, for example, a high-performance sliding seismic isolation device having a slider that achieves a bearing stress of 60 N/mm$^2$ (60 MPa) has been proposed, which is specifically a sliding seismic isolation device including an upper shoe (superstructure fixation plate) and a lower shoe (substructure fixation plate) having respective sliding surfaces with a curvature and a steel slider having an upper surface and a lower surface with a curvature that contact the upper shoe and the lower shoe, respectively, between the upper shoe and the lower shoe. A double-layered fabric layer composed of PTFE fibers and fibers higher in tensile strength than PTFE fibers is provided on each of the upper surface and the lower surface of the slider (see, for example, Patent Document 1).

PRIOR ART DOCUMENT

Patent Document

Patent Document 1: Japanese Pat. No. 5521096

SUMMARY OF THE INVENTION

Problems to be Solved by the Invention

According to the sliding seismic isolation device described in Patent Document 1, it is possible to provide a sliding seismic isolation device with high seismic isolation performance, resisting a bearing stress of approximately 60 Mpa. Furthermore, according to the sliding seismic isolation device described in Patent Document 1, a friction member composed of a double-layered fabric formed of PTFE (polytetrafluoroethylene) fibers and fibers higher in tensile strength than PTFE fibers (high-strength fibers such as PPS (polyphenylenesulfide) fibers) is attached to each of the upper and the lower sliding surface of the slider. More specifically, the double-layered fabric is fixed to each of the upper and the lower surface of the slider by an adhesive or the like with the PTFE fibers positioned closer to the superstructure or substructure fixation plate on each of the upper and the lower surface of the slider. As a result of applying this type of slider, even if the PTFE fibers are worn and reduced in thickness because of sliding movements, an abrasion powder of the PTFE fibers enters the PPS fibers present on the adhesion surface side of the slider, so that at least some of the PTFE fibers can face the sliding surfaces of the superstructure and the substructure fixation plate. Therefore, it is possible to enjoy the good slidability of PTFE fibers and to maintain a predetermined coefficient of friction for a while.

According to the above-described sliding seismic isolation device, the double-layered fabric has a structure where the PTFE fabrics are provided on the sliding side and the high-strength fibers are provided on the adhesion side. The presence of these high-strength fibers makes it possible to withstand a high bearing stress of 60 MPa. Furthermore, the PTFE fibers are exposed on the sliding side, and their discharge is accelerated by abrasion during sliding. As a result, there is no accumulation of excess fiber pools in the PTFE fiber layer to ensure the stability of the coefficient of friction. Furthermore, the PTFE fiber layer has the function of being able to ensure a certain coefficient of friction for the time being by clogging up stitches of the lower layer of high-strength fibers even if the PTFE fiber layer is worn away. On the other hand, the PTFE fiber layer, which is discharged by abrasion, has a problem in sliding durability. In this respect, it is possible to improve the durability by increasing the thickness of the PTEE fibers. Under a high bearing stress of 60 MPa, however, an increase in the thickness is less likely to effectively function because of the compressive deformation of the PTEE fiber layer. For the foregoing reasons, there is a limit to the improvement of sliding durability.

The present disclosure provides a sliding seismic isolation device having good sliding durability without a significant increase in the thickness of a friction material.

Means for Solving the Problems

A configuration of a sliding seismic isolation device according to the present disclosure is a sliding seismic isolation device including a structure fixation plate having a first sliding surface and a metallic slider having a second sliding surface contacting the first sliding surface, where a friction member composed of a single-layer fabric formed of multiple plied yarns into which high-strength fibers and PTFE fibers are twisted together is attached to the first sliding surface, the second sliding surface, or both of the first sliding surface and the second sliding surface.

According to this configuration, it is possible to form a sliding seismic isolation device having high sliding durability by using a single-layer fabric as a friction member and attaching the friction member composed of the single-layer fabric to one or both of a first sliding surface of a structure fixation plate and a second sliding surface of a slider, where multiple plied yarns into which high-strength fibers and PTFE fibers are twisted together, serving as warp threads or weft threads, and multiple plied yarns serving as weft threads or warp threads are woven together into the single-layer fabric. The same as the sliding seismic isolation device described in Patent Document 1, the sliding seismic isolation device according to this configuration as well serves as a sliding seismic isolation device of high seismic isolation performance, resisting a bearing stress of approximately 60 MPa.

Here, that "a friction member is attached to the first sliding surface, the second sliding surface, or both of the first sliding surface and the second sliding surface" includes a configuration where a friction member is attached to only a first sliding surface of a structure fixation plate, a configuration where a friction member is attached to only a second sliding surface of a slider, and a configuration where a friction member is attached to both of the first sliding surface and the second sliding surface.

According to the single-layer fabric composing the sliding seismic isolation device of this configuration, in the plied yarns into which high-strength fibers and PTFE fibers are twisted together, the internal cohesion of the PTFE fibers occurs (the PTFE fibers are held by the high-strength fibers). As a result, an abrasion powder of the PTFE fibers is less likely to be discharged (less likely to deposit), thus resulting in a longer remaining service life of the PTFE fibers. Here, when the plied yarns are, for example, warp threads (weft threads), high-strength fibers forming the plied yarns or the like may be applied as weft threads (warp threads).

Furthermore, the single-layer fabric composed of the plied yarns into which the high-strength fibers and the PTFE fibers are twisted together may be applied to the first sliding surface of the metallic structure fixation plate or the second sliding surface of the metallic slider via an adhesive such as an epoxy resin adhesive. It has been verified that there is no removal of the friction member under a bearing stress of approximately 60 MPa.

Furthermore, according to another configuration of the sliding seismic isolation device according to the present disclosure, the single-layer fabric has one of a configuration where both of the warp and the weft are composed of the plied yarns, a configuration where only one of the warp and the weft is composed of the plied yarns and the other is composed of the high-strength fibers, or a configuration where only one of the warp and the weft is composed of the plied yarns and the other is composed of PTFE fibers.

According to this configuration, whichever configuration the single-layer fabric of the friction member has, the sliding seismic isolation device has better sliding durability than a sliding seismic isolation device including a friction member composed of a double-layered fabric. In this specification, literally, "warp threads" are threads extending in a longitudinal direction (vertical direction) and "weft threads" are threads extending in a lateral direction (horizontal direction) in a plan view. When rotated 90°, the warp threads and the weft threads are reversed, and the warp threads and the weft threads before rotation are weft threads and warp threads, respectively. Accordingly, for example, "a configuration where only the warp threads are composed of plied yarns and the weft threads are composed of high-strength fibers" may include "a configuration where only the weft threads are composed of plied yarns and the warp threads are composed of high-strength fibers," is not strictly bound by the term "warp" or "weft."

Furthermore, by changing the method of weaving warp threads and weft threads, it is possible to change the area of exposure of the PTFE fibers exposed at the top surface of the friction member. Even when the weight ratio of the PTFE fibers in the friction member remains the same, a change in the area of exposure of the PTFE fibers changes a friction force reduction effect. Likewise, by changing the method of weaving warp threads and weft threads, it is possible to change the area of exposure of the high-strength fibers exposed at the bottom surface of the friction member. An increase in the area of exposure of the high-strength fibers makes it possible to increase the strength of the bonding of the friction member to the structure fixation plate or the slider. Specifically, the weave is preferably a twill weave or a satin weave. Furthermore, in terms of reducing the misalignment of the friction member, a twill weave is more preferable. Among twill weaves, a 3/1 twill weave and a 2/1 twill weave, which make it possible to control the ratio of the above-described PTFE fibers and PTFE fibers exposed at the top surface and the bottom surface, may be specified as particularly preferable conditions. Here, as the warp threads and the weft threads may be reversely interpreted as described above, the above-described 3/1 twill weave and 2/1 twill weave may also be rotated 90° to be interpreted as a 1/3 twill weave and a 1/2 twill weave, respectively.

Furthermore, according to another configuration of the sliding seismic isolation device according to the present disclosure, the high-strength fibers are PPS fibers or liquid crystal polyester fibers.

According to this configuration, PPS fibers or liquid crystal polyester fibers are applied as the high-strength fibers to form plied yarns with the PTFE fibers, and the sliding seismic isolation device is formed with good sliding durability by including the friction member composed of the single-layer fabric formed of these plied yarns.

Furthermore, according to another configuration of the sliding seismic isolation device according to the present disclosure, the weight ratio of the PTFE fibers in the single-layer fabric is 70% or less.

According to this configuration, because the weight ratio of the PTFE fibers in the single-layer fabric is 70% or less, the sliding durability can be improved compared with, for example, that of a sliding seismic isolation device including a friction member composed of a double-layered fabric formed of PTFE fibers and PPS fibers. That the weight ratio of the PTEE fibers becomes lower than or equal to 70% means an increase in the weight ratio of the high-strength fibers, and an increase in the weight ratio of the high-strength fibers causes the high-strength fibers to reduce the deposition of the PTFE fibers.

Furthermore, according to another configuration of the sliding seismic isolation device according to the present disclosure, the sliding seismic isolation device is of double-sided sliding bearing in which the structure fixation plate includes a superstructure fixation plate and a substructure fixation plate each having the first sliding surface, the slider has the second sliding surface at each of its upper surface and lower surface, and the second sliding surface of the upper surface and the second sliding surface of the lower surface contact the first sliding surface on the upper side and the first sliding surface on the lower side, respectively, and the friction member is attached to the respective first sliding surfaces of the superstructure fixation plate and the substructure fixation plate, the second sliding surfaces of the upper surface and the lower surface of the slider, or both of the first sliding surfaces and the second sliding surfaces.

According to this configuration, the friction member composed of the single-layer fabric is attached to the respective first sliding surfaces of the superstructure fixation plate and the substructure fixation plate, the second sliding surfaces of the upper surface and the lower surface of the slider, or both of the first sliding surfaces and the second sliding surfaces. Therefore, a sliding seismic isolation device of double-sided sliding bearing having high sliding durability can be formed without a significant increase in the thickness of the friction member. This sliding seismic isolation device of double-sided sliding bearing is commonly applied to, for example, general buildings such as high-rise buildings.

Furthermore, according to another configuration of the sliding seismic isolation device according to the present disclosure, the sliding seismic isolation device is of single-sided sliding bearing in which the structure fixation plate has the first sliding surface, the slider has the second sliding surface contacting the first sliding surface, and is held by a receiving plate, and the friction member is attached to the first sliding surface of the structure fixation plate, the second sliding surface of the slider, or both of the first sliding surface and the second sliding surface.

According to this configuration, the friction member composed of the single-layer fabric is attached to the first sliding surface of the structure fixation plate, the second sliding surface of the slider, or both of the first sliding surface and the second sliding surface. Therefore, a sliding seismic isolation device of single-sided sliding bearing having high sliding durability can be formed. This sliding seismic isolation device of single-sided sliding bearing is applied to, for example, bridges, etc., in addition to general buildings.

Effects of the Invention

According to the sliding seismic isolation device of the present disclosure, it is possible to provide a sliding seismic isolation device having good sliding durability without a significant increase in the thickness of a friction material.

EMBODIMENTS OF THE INVENTION

Figure 1:
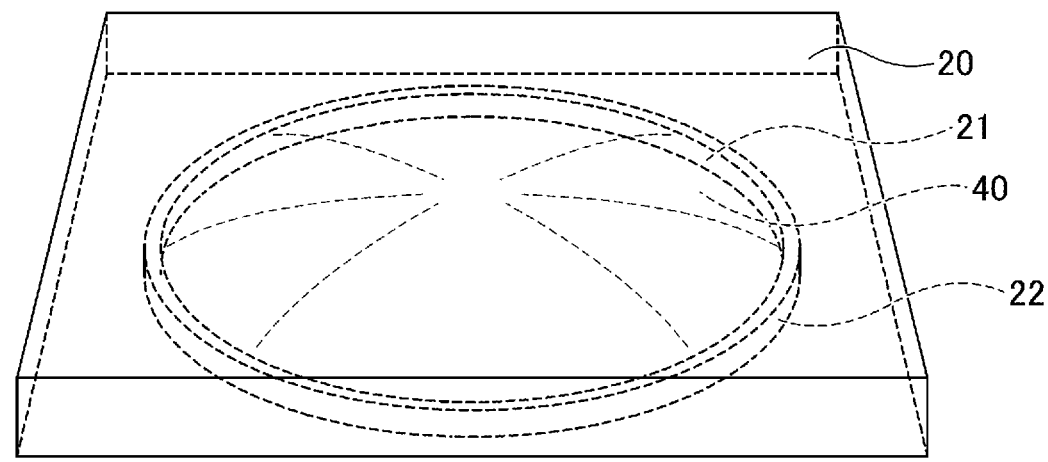
FIG. 1 is an exploded perspective view of a sliding seismic isolation device according to a first embodiment.
Figure 1:
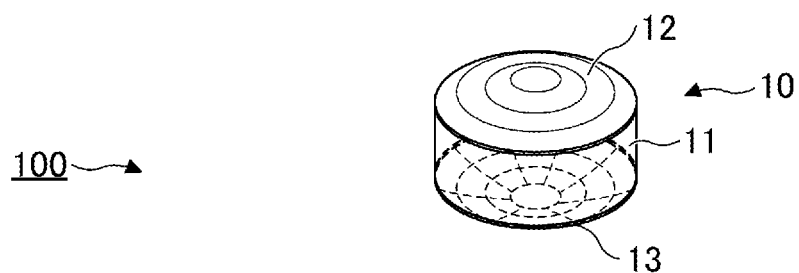
Figure 1:
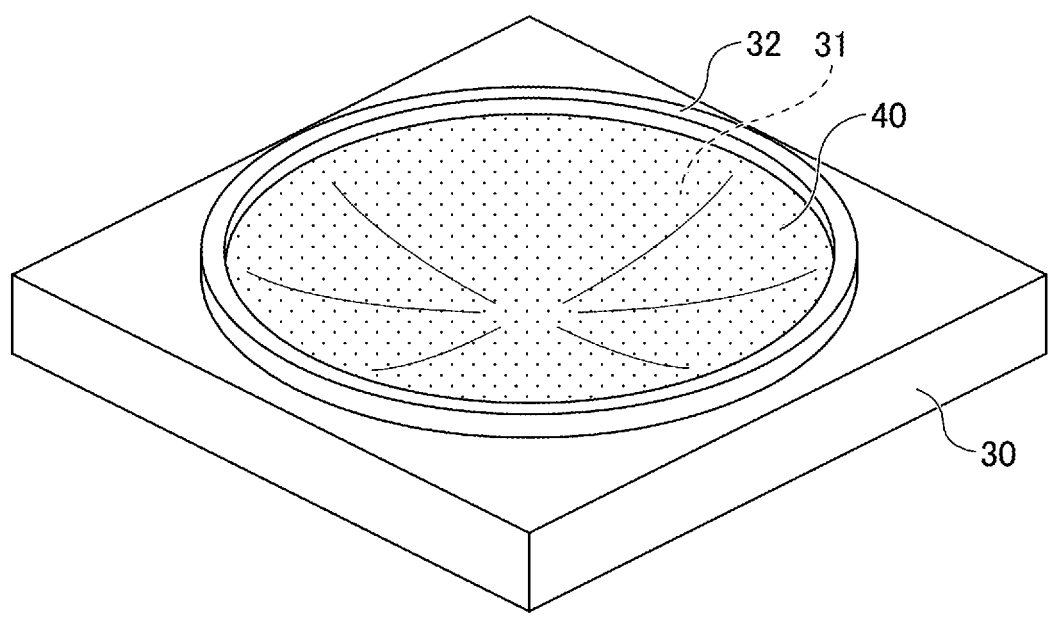

Sliding seismic isolation devices according to embodiments are described below with reference to the accompanying drawings. In the specification and drawings, substantially the same constituent elements are referred to using the same reference numerals, and a duplicate description thereof may be omitted.

[Sliding Seismic Isolation Device according to First Embodiment]

Figure 2:
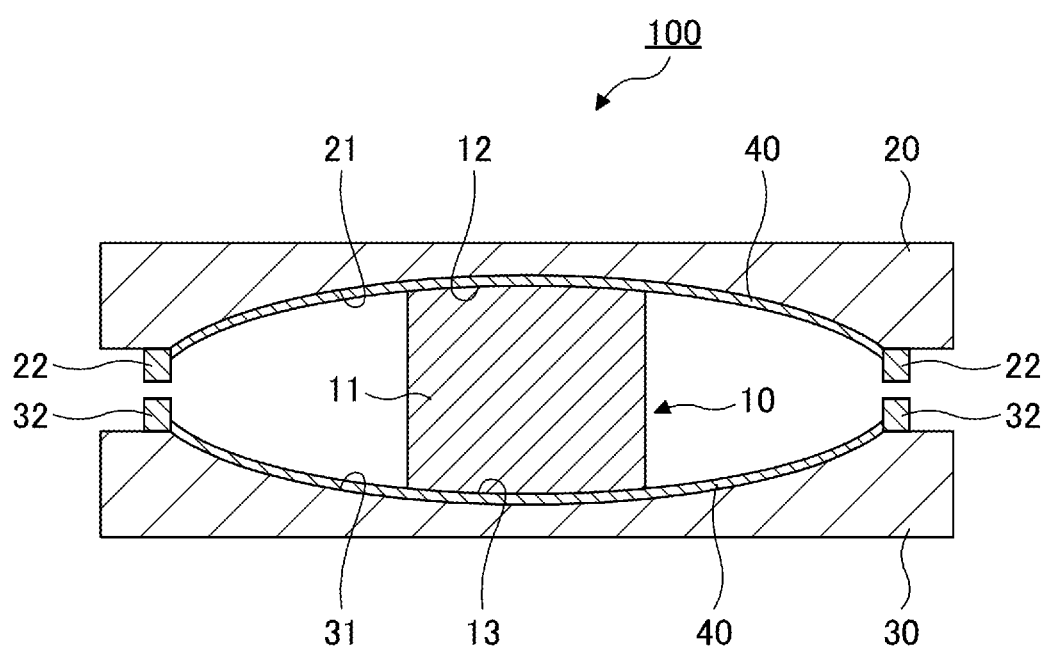
FIG. 2 is a vertical sectional view of the sliding seismic isolation device according to the first embodiment.
Figure 3:
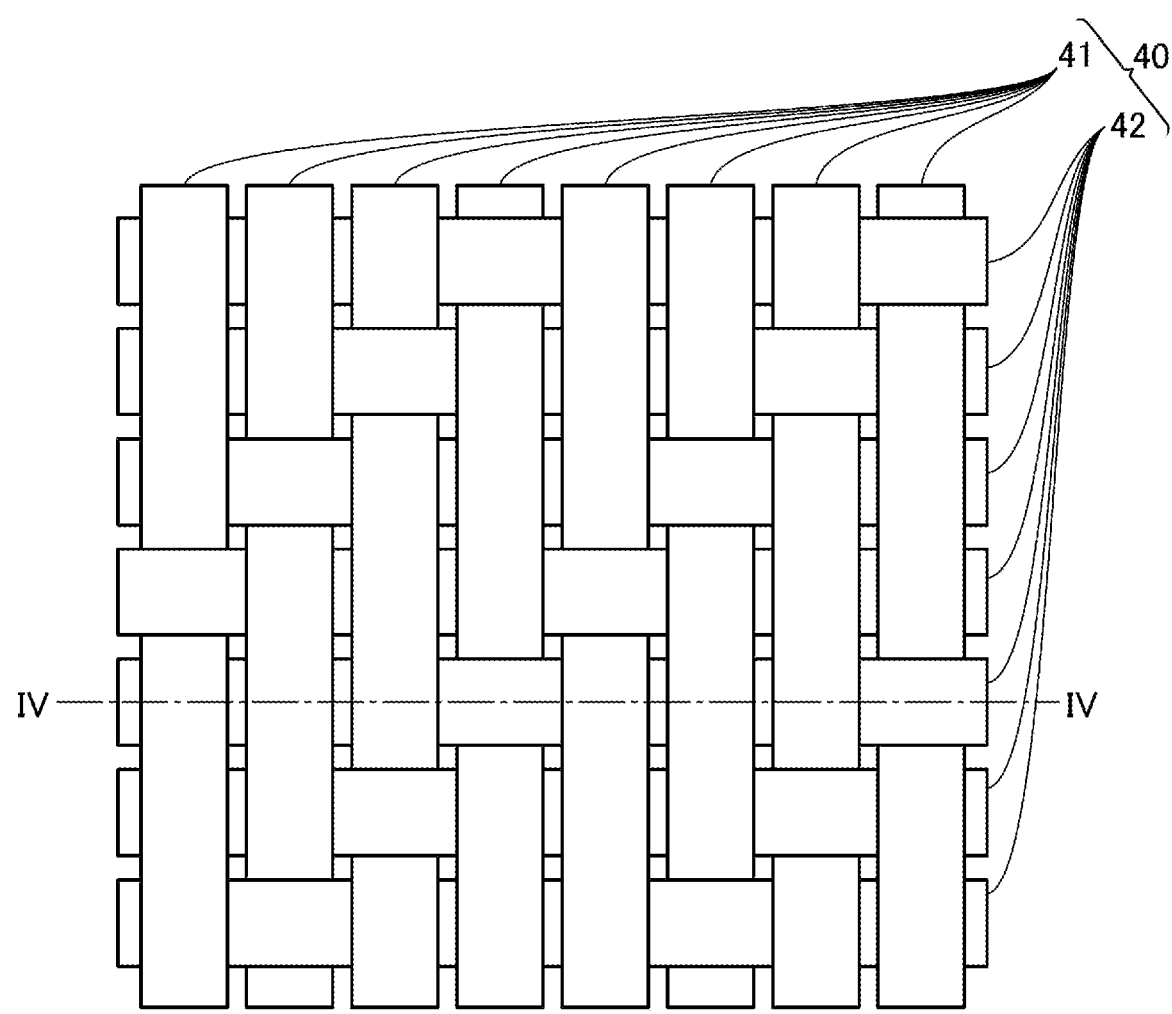
FIG. 3 is a top plan view of a friction member composed of a single-layer fabric.
Figure 4:
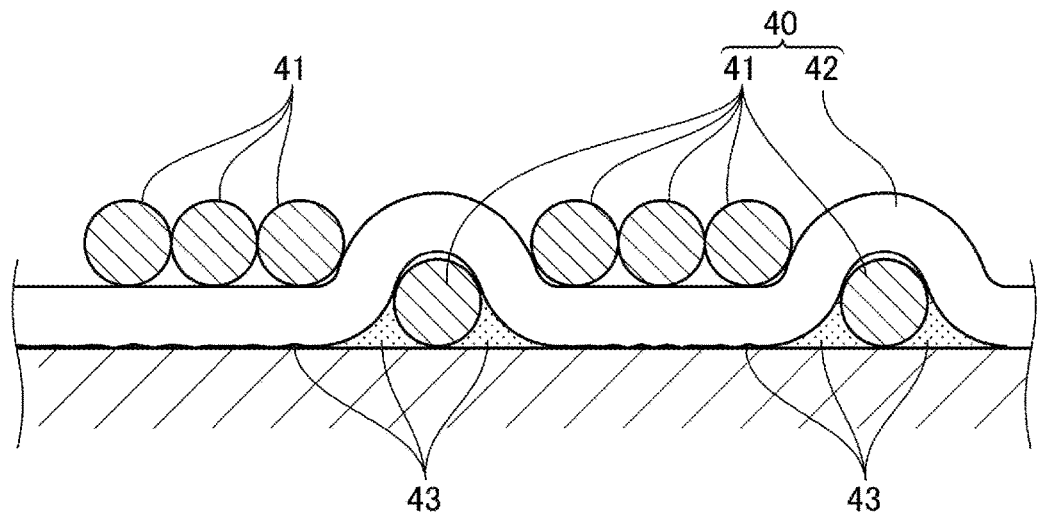
FIG. 4 is a sectional view taken along the line IV-IV of FIG. 3, illustrating a structure of an example of the friction member composed of a single-layer fabric along with its form of attachment to a structure fixation plate.

First, an example of a sliding seismic isolation device according to an embodiment is described with reference to FIGS. 1 through 4. Here, FIG. 1 is an exploded perspective view of a sliding seismic isolation device according to a first embodiment, and FIG. 2 is a vertical sectional view of the sliding seismic isolation device according to the first embodiment. Furthermore, FIG. 3 is a top plan view of a friction member composed of a single-layer fabric, and FIG. 4 is a sectional view taken along the line IV-IV of FIG. 3, illustrating a structure of an example of the friction member composed of a single-layer fabric along with its form of attachment to a structure fixation plate.

A sliding seismic isolation device 100 is a sliding seismic isolation device of double-sided sliding bearing, including a superstructure fixation plate 20 (an example of a structure fixation plate) and a substructure fixation plate 30 (an example of a structure fixation plate) including respective sliding surfaces having a curvature (first sliding surfaces) and a metal slider 10. The slider 10 is provided between the superstructure fixation plate 20 and the substructure fixation plate 30, and includes an upper surface 12 and a lower surface 13 (each of which is a second sliding surface) having the same curvature as a lower surface 21, which is the first sliding surface of the superstructure fixation plate 20, and an upper surface 31, which is the first sliding surface of the substructure fixation plate 30.

Each of the superstructure fixation plate 20 and the substructure fixation plate 30 is a plate member having a square shape in a plan view, and is famed of rolled steel for welded steel (SM490A, B, or C, SN490B or C, or S45C), stainless steel (SUS), cast steel, cast iron, or the like. The first sliding surfaces provided on the lower surface 21 of the superstructure fixation plate 20 and the upper surface 31 of the substructure fixation plate 30 are curved and have a circular shape in a plan view. Friction members 40 are attached one on each first sliding surface.

The slider 10 includes a substantially cylindrical slider body 11. The upper surface 12 and the lower surface 13, having the same curvature as the lower surface 21 of the superstructure fixation plate 20 and the upper surface 31 of the substructure fixation plate 30, are formed on the slider body 11. Furthermore, the same as the superstructure fixation plate 20 and the substructure fixation plate 30, the slider body 11 is famed of rolled steel for welded steel (SM490A, B, or C, SN490B or C, or S45C), stainless steel (SUS), cast steel, cast iron, or the like, and has a load-bearing strength against a bearing stress of approximately 60 N/mm² (60 MPa).

Stopper rings 22 and 32 for preventing removal of the slider 10 are fixed at the outer edges of the lower surface 21 of the superstructure fixation plate 20 and the upper surface 31 of the substructure fixation plate 30, respectively.

Metal surfaces are exposed at the upper surface 12 and the lower surface 13 of the slider 10. For example, according to a configuration where the slider body 11 is made of stainless steel, metal surfaces formed of stainless steel surfaces are exposed at the upper surface 12 and the lower surface 13. Furthermore, according to a configuration where the slider body 11 is made of steel other than stainless steel, stainless steel plates having a curvature may be attached one on each of the upper and the lower surface of the slider body 11 to form the upper and lower metal surfaces. Preferably, the metal surfaces formed of stainless steel surfaces are mirror-finished surfaces.

While the illustrated example is a configuration where the friction members 40 are attached to the first sliding surfaces 21 and 31 of the superstructure fixation plate 20 and the substructure fixation plate 30, a configuration where friction members are attached to the upper and lower second sliding surfaces 12 and 13 of the slider 10 and stainless steel plates are attached to the first sliding surfaces 21 and 31 of the superstructure fixation plate 20 and the substructure fixation plate 30 is also possible. Furthermore, a configuration where friction members are attached to both of the first sliding surfaces 21 and 31 and the second sliding surfaces 12 and 13 is also possible.

As illustrated in FIGS. 3 and 4, the friction members 40 are famed of a single-layer fabric. The single-layer fabric 40 includes multiple warp threads 41 and multiple weft threads 42, and the warp threads 41 and the weft threads 42 are woven together with a 3/1 twill weave with a warp density of 54 threads per 2.54 cm and a weft density of 33 threads per 2.54 cm. The warp threads 41 are formed of plied yarns obtained by twisting PTFE fibers ("TOYOFLON" (registered trademark), a product of Toray Industries, Inc.) having a total fineness of 880 dtex, a number of single threads of 120 filaments, and a number of twists of 33 t/m and liquid crystal polyester fibers ("SIVERAS" (registered trademark), a product of Toray Industries, Inc.) having a total fineness of 850 dtex, a number of single threads of 144 filaments, and a number of twists of 33 t/m together with a number of twists of 167 t/m. Furthermore, the weft threads 42 are composed of liquid crystal polyester fibers ("SIVERAS" (registered trademark), a product of Toray Industries, Inc.) having a total fineness of 1700 dtex and a number of single threads of 288 filaments. While the illustrated example is a configuration where only the warp threads 41 are composed of plied yarns, a configuration where only the weft threads 42 are composed of plied yarns or a configuration where both of the warp threads 41 and the weft threads 42 are composed of plied yarns is also possible.

Here, a plied yarn is a yarn into which high-strength fibers and PTFE fibers are twisted together. PPS fibers or liquid crystal polyester fibers are applied as high-strength fibers. As PTFE fibers, TOYOFLON (registered trademark), which is a product of Toray Industries, Inc., may be applied. Furthermore, as PPS fibers, "TORCON" (registered trademark), which is a product of Toray Industries, Inc., may be applied. In addition, as liquid crystal polyester fibers, SIVERAS (registered trademark), which is a product of Toray Industries, Inc., may be applied.

According to the illustrated example, high-strength fibers such as PPS fibers or liquid crystal polyester fibers, or PTFE fibers are applied as the weft threads 42.

According to the sliding seismic isolation device 100 of this embodiment, the weight ratio of PTFE fibers in the single-layer fabric 40 to which they are applied is set to be 70% or less. Here, the weight ratio of PTFE fibers refers to the weight by ratio of PTFE fibers to the entirety of the single-layer fabric 40, and is calculated and obtained according to the following procedure, in which:

(1) a fabric is cut to a size of 200 mm in length and 200 mm in width, and thereafter, warp threads and weft threads are unraveled and the total weight W of the unraveled threads is measured;

(2) only composite threads are selected from the unraveled threads, and the total weight W1 of the composite threads in the fabric is measured;

(3) any five composite threads are selected and separated into fluororesin fibers A and other fibers, and their respective weights are measured. The ratio by weight of the fluororesin fibers A to the composite threads, a, is calculated by Equation: $\alpha = W_F/W \times 100(\%)$, where W is the weight sum of the five composite threads and $W_F$ is the weight sum of the fluororesin fibers A of the five composite threads.

If it is impossible to secure the amount of unraveled threads required for the above-described measurement method, however, the result of testing with a maximum length that can be secured and the number of trials is substituted;

(4) fluororesin fibers that are present not in the composite threads but alone in the fabric are selected, and their total weight W2 is measured; and (5) the ratio by weight of the fluororesin fibers A in the fabric, Y, is calculated by Equation: $Y = \{(W1 \times \alpha/100 + W2)/W\} \times 100$ (%).

If it is impossible to secure the amount of unraveled threads required for the above-described measurement method, however, the result of testing with a maximum length that can be secured is substituted.

The numerical limitation with respect to the weight ratio of these PTEE fibers is based on the results of the experiments on sliding as described in detail below. That the weight ratio of PTFE fibers becomes lower than or equal to 70% means an increase in the weight ratio of high-strength fibers, and an increase in the weight ratio of high-strength fibers causes the high-strength fibers to reduce the deposition of PTFE fibers. In the plied yarns, the PTFE fibers are retained among the high-strength fibers. Therefore, the amount of deposition of PTEE fibers is reduced. Accordingly, the effect is conspicuous specifically under a high load of approximately 60 MPa.

The single-layer fabric 40 illustrated in FIGS. 3 and 4, which employs a 3/1 twill weave, is woven such that the warp threads 41 composed of plied yarns are exposed at the surface more than the weft threads 42 composed of high-strength fibers. Such design makes it possible to expose the plied yarns including PTFE fibers more at the surface, causing a difference in the friction force reduction effect due to PTFE fibers even when the weight ratio of PTFE fibers of the friction member 40 remains the same. The single-layer fabric 40 of the illustrated example is an example of a single-layer fabric that is preferable in terms of both the friction force reduction effect due to PTFE fibers and the PTFE fibers deposition amount reduction effect due to high-strength fibers.

Furthermore, as illustrated in FIG. 4, the friction member 40 is bonded to the metallic structure fixation plate 30(20) by an adhesive 43 such as an epoxy resin adhesive. According to the single-layer fabric 40 of the illustrated example, the weft threads 42 are bonded to the adhesive 43 in a large area, so that, for example, in the case of applying the weft threads 42 composed of high-strength fibers, it is possible to increase the strength of the bonding of the friction member 40 to the structure fixation plate 30, etc.

Figure 5:
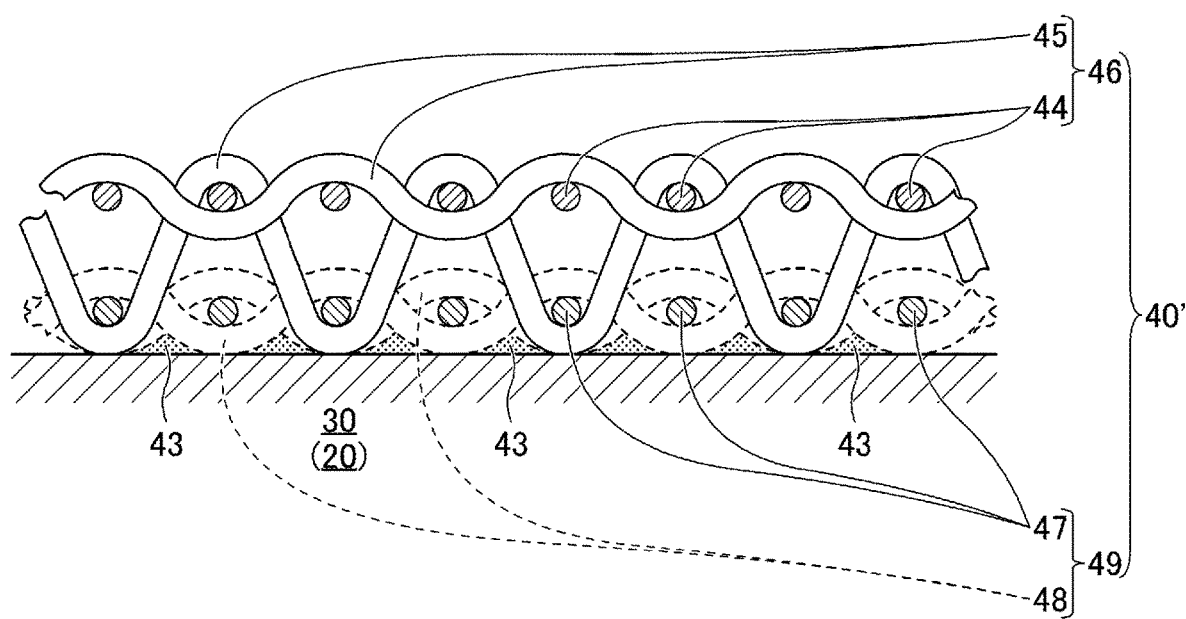
FIG. 5 is a diagram illustrating a structure of an example of a friction member composed of a double-layered fabric along with its form of attachment to a structure fixation plate.

Here, a friction member 40' composed of a double-layered fabric is illustrated in FIG. 5 for comparison with the friction member 40 composed of a single-layer fabric as illustrated in FIGS. 3 and 4.

The illustrated double-layered fabric 40' is formed of PTFE fibers 46 and PPS fibers 49 higher in tensile strength than the PTFE fibers 46.

According to the structure of the double-layered fabric 40', weft threads 47 of the PPS fibers 49 are provided on the side of the superstructure fixation plate 20 or the substructure fixation plate 30, and warp threads 48 of the PPS fibers 49 are woven in such a manner as to interlace with the weft threads 47. Furthermore, above these (at respective positions on the slider 10 side), weft threads 44 of the PTFE fibers 46 are provided, and warp threads 45 of the PTFE fibers 46 are woven in such a manner as to interlace with the weft threads 44 of the PTFE fibers 46 and are also woven in such a manner as to interlace with the weft threads 47 of the PPS fibers 49 positioned further below. The double-layered fabric 40', which is a friction member, is fixed to the lower surface 21 of the superstructure fixation plate 20 and the upper surface 31 of the substructure fixation plate 30 by the adhesive 43 with the PTFE fibers 46 provided on the slider 10 side.

As illustrated in Patent Document 1, the sliding seismic isolation device including a friction member composed of the illustrated double-layered fabric 40' as well achieves good seismic isolation performance under a high load of a bearing stress of approximately 60 MPa. The inventors of the present invention, etc., however, have identified that, in terms of reducing the deposition of PTFE fibers under such a high load, the friction member 40 composed of a single-layer fabric constituting the sliding seismic isolation device 100 of this embodiment is better (deposits a smaller amount of PTFE fibers) than the friction member 40' composed of a double-layered fabric.

According to the sliding seismic isolation device 100, the friction members 40 composed of a single-layer fabric are attached on the first sliding surfaces 21 and 31 of the structure fixation plates 20 and 30. Accordingly, the sliding seismic isolation device 100 is formed with high sliding durability while resisting a bearing stress of approximately 60 MPa, without a significant increase in the thickness of the friction members 40.

[Sliding Seismic Isolation Device according to Second Embodiment]

Figure 6:
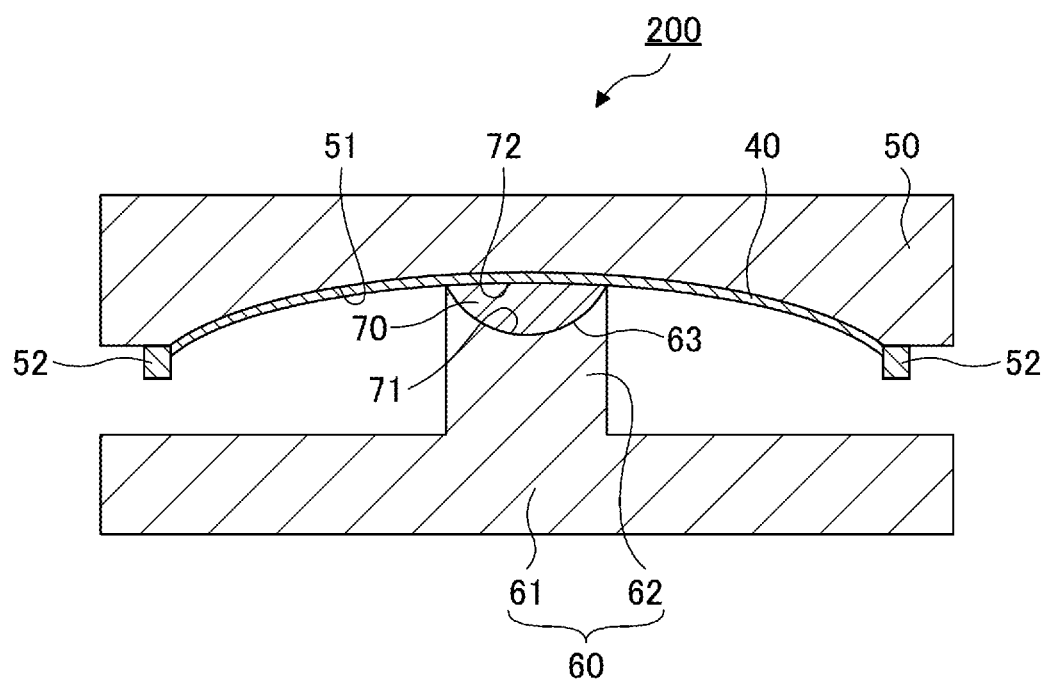
FIG. 6 is a vertical sectional view of a sliding seismic isolation device according to a second embodiment.

Next, an example of a sliding seismic isolation device according to a second embodiment is described with reference to FIG. 6. Here, FIG. 6 is a vertical sectional view of a sliding seismic isolation device according to the second embodiment.

A sliding seismic isolation device 200 is a sliding seismic isolation device of single-sided sliding bearing, including a structure fixation plate 50 including a lower surface 51 (a first sliding surface) having a curvature and a receiving plate 60 on which a metallic slider 70 including an upper surface 72 (a second sliding surface) having the same curvature as the lower surface 51 is slidably received.

The receiving plate 60 includes a base plate 61 and a cylindrical body 62 protruding upward from the base plate 61 at the central position of the base plate 61. The base plate 61 and the cylindrical body 62 are famed as a one-piece structure. The top end of the cylindrical body 62 is depressed downward to form a concave spherical surface 63. Each of the structure fixation plate 50 and the base plate 61 is a plate member having a square shape in a plan view. Each of the structure fixation plate 50, the receiving plate 60, and the slider 70 is formed of the same material as the superstructure fixation plate 20 and the substructure fixation plate 30.

The slider 70, which includes a lower surface 71 (a convex spherical surface) having the same curvature as the concave spherical surface 63 and includes the upper surface 72 having the same curvature as the lower surface 51 of the structure fixation plate 50, is slidably received and held on the concave spherical surface 63 of the cylindrical body 62. A metal surface is exposed at the upper surface 72 of the slider 70.

The friction member 40 composed of a single-layer fabric is fixed to the lower surface 51 of the structure fixation plate 50 in the same manner as the friction member 40 is attached to the lower surface 21 of the superstructure fixation plate 20. Furthermore, a stopper ring 52 for preventing removal of the cylindrical body 62 on which the slider 70 is slidably received is fixed at the outer edge of the lower surface 51 of the structure fixation plate 50.

According to the illustrated sliding seismic isolation device 200, the structure fixation plate 50 is provided on the upper side. However, a sliding seismic isolation device whose structure is upside down relative to FIG. 4 to have a receiving plate with a slider on the upper side and a structure fixation plate on the lower side is also possible.

Thus, according to the sliding seismic isolation device 200 as well, because the friction member 40 composed of a single-layer fabric is attached to the first sliding surface 51 of the structure fixation plate 50, the sliding seismic isolation device 200 is famed with high sliding durability while resisting a bearing stress of approximately 60 MPa, without a significant increase in the thickness of the friction member 40.

[Sliding Experiments]

<Sliding Experiment 1>

Next, Sliding Experiment 1 conducted by the inventors of the present invention, etc., is described. Sliding Experiment 1 is an experiment that compares the sliding distances of a friction member composed of a double-layered fabric and a friction member composed of a single-layer fabric.

(Experiment Overview and Experimental Results)

Three types of test samples were made by bonding various friction members serving as samples to metallic substrates. SS400 (rolled steel plate for general structure) was applied as a metallic substrate, and an epoxy resin (resin: hardener=4:1) was used as an adhesive and applied at 25 g/m$^2$.

As a testing machine, MODEL: EFM-III-EN, a product of A & D Company, Limited, was used, and tests were conducted with a friction load of 20 MPa and at a friction speed of 400 mm/s. As a counterpart member, a ring made of S45C and having a hollow cylindrical shape of 25.6 mm in outside diameter, 20 mm in inside diameter, and 15 mm in length was used. The surface of the ring was polished with sandpaper to be adjusted to a surface roughness Ra of 0.8 μmm±0.1. A roughness measuring device (MITUTOYO SJ-201) was used to measure the roughness. In this sliding experiment, the sliding distance was measured until the friction member was broken.

The specifications and the experimental results of the friction members constituting the test samples of Comparative Example and Examples 1 and 2 are shown below in Table 1. Here, Example 1 is a single-layer fabric woven with a 3/1 twill weave, using plied yarns obtained by twisting PTFE fibers ("TOYOFLON" (registered trademark), a product of Toray Industries, Inc.) and PPS fibers ("TORCON" (registered trademark), a product of Toray Industries, Inc.) together for warp threads and using PPS fibers ("TORCON" (registered trademark), a product of Toray Industries, Inc.) for weft threads. Example 2 is the above-described single-layer fabric 40 of the illustrated example woven with a 3/1 twill weave, using plied yarns obtained by twisting PTFE fibers ("TOYOFLON" (registered trademark), a product of Toray Industries, Inc.) and liquid crystal polyester fibers ("SIVERAS" (registered trademark), a product of Toray Industries, Inc.) together for warp threads and using liquid crystal polyester fibers ("SIVERAS" (registered trademark), a product of Toray Industries, Inc.) for weft threads. Comparative Example 1 is a double-layered fabric woven with a plain weave on each of the top side and the bottom side, using PTFE fibers ("TOYOFLON" (registered trademark), a product of Toray Industries, Inc.) for warp threads and weft threads on the top side and using PPS fibers ("TORCON" (registered trademark), a product of Toray Industries, Inc.) for warp threads and weft threads on the bottom side.

TABLE 1

| | | Comparative Example 1 | Example 1 | Example 2 |
|---|---|---|---|---|
| Fabric Type | | Double-Layered Fabric of PTFE Fibers and PPS Fibers | Single-Layer Fabric of PTFE Fibers and PPS Fibers | Single-Layer Fabric of PTFE Fibers and Liquid Crystal Polyester Fibers |
| Weave | | Double Plain Weave | Single 3/1 Twill Weave | Single 3/1 Twill Weave |
| Thread Type | Warp | PTFE Fibers and PPS Fibers | Plied Yarns of PTFE Fibers and PPS Fibers | Plied Yarns of PTFE Fibers and Liquid Crystal Polyester Fibers |
| | Weft | PTFE Fibers and PPS Fibers | PPS Fibers | Liquid Crystal Polyester Fibers |
| Ring Wear Test Result Sliding Distance (m) | | 32 | 62 | 109 |

From Table 1, it is determined that the sliding distance of Example 1 is 62 m, which is approximately twice, and the sliding distance of Example 2 is 109 m, which is more than three times, compared with the sliding distance of 32 m of Comparative Example 1, and it is confirmed that a friction member composed of a single-layer fabric enjoys a longer sliding distance and better sliding durability than a friction member composed of a double-layered fabric.

<Sliding Experiment 2>

Next, Sliding Experiment 2 conducted by the inventors of the present invention, etc., is described. Sliding Experiment 2 is an experiment for verifying the optimum range of the weight ratio of PTFE fibers in a friction member.

(Experiment Overview and Experimental Results)

The method of making test samples is the same as in Sliding Experiment 1.

The specifications and the experimental results of the friction members constituting the test samples of Examples 2 through 4 are shown below in Table 2. Here, the ratio by weight of PTFE fibers to the fabric of Example 2 is 32%. Example 3 is a single-layer fabric made in the same manner as Example 2 except that PTFE fibers ("TOYOFLON" (registered trademark), a product of Toray Industries, Inc.) are used for weft threads, and the ratio by weight of PTFE fibers to the fabric is 70%. Example 4 is a single-layer fabric made in the same manner as Example 2 except that liquid crystal polyester fibers ("SIVERAS" (registered trademark), a product of Toray Industries, Inc.) are used for weft threads, and the ratio by weight of PTFE fibers to the fabric is 51%.

TABLE 2

| | | Example 3 | Example 4 | Example 2 |
|---|---|---|---|---|
| Fabric Type | | Single-Layer Fabric of PTFE Fibers and Liquid Crystal Polyester Fibers | | |
| Weave | | Single 3/1 Twill Weave | | |
| Ratio by Weight of PTFE Fibers (%) | | 70 | 51 | 32 |
| Thread Type | Warp | Plied Yarns of PTFE Fibers and Liquid Crystal Polyester Fibers | | |
| | Weft | PTFE Fibers | Plied Yarns of PTFE Fibers and Liquid Crystal Polyester Fibers | Liquid Crystal Polyester Fibers |
| Ring Wear Test Result Sliding Distance (m) | | 50 | 72 | 109 |

It is determined from Table 2 that the sliding distance of Example 3 is 50 m, which is approximately 1.5 times, the sliding distance of Example 4 is 72 m, which is more than twice, and as described above, Example 2 is 109 m, which is more than three times, compared with the sliding distance of 32 m of Comparative Example 1 shown in Table 1.

The sliding distance increases in the order of Examples 3, 4 and 2, and it is determined that the sliding distance increases as the ratio by weight of TOYOFLON decreases from 70%. From this experimental result, the weight ratio of PTFE fibers in a single-layer fabric can be determined to be 70% or less.

<Sliding Experiment 3>

Next, Sliding Experiment 3 conducted by the inventors of the present invention, etc., is described. Sliding Experiment 3 is an experiment that compares the sliding distances of a sliding seismic isolation device including a friction member composed of a double-layered fabric (Comparative Example 2) and a sliding seismic isolation device including a friction member composed of a single-layer fabric (Example 5) under a bearing stress of 60 MPa.

(Experiment Overview and Experimental Results)

The double-layered fabric forming the friction member of the sliding seismic isolation device of Comparative Example 2 is a double-layered fabric composed of PTEE fibers and PPS fibers. The single-layer fabric forming the friction member of the sliding seismic isolation device of Example 5 is the same as Example 2. The slider is 130 mm in diameter and 65 mm in height in both Comparative Example 2 and Example 5. In this sliding experiment as well, the sliding distance was measured until the friction member was broken.

Figure 7A:
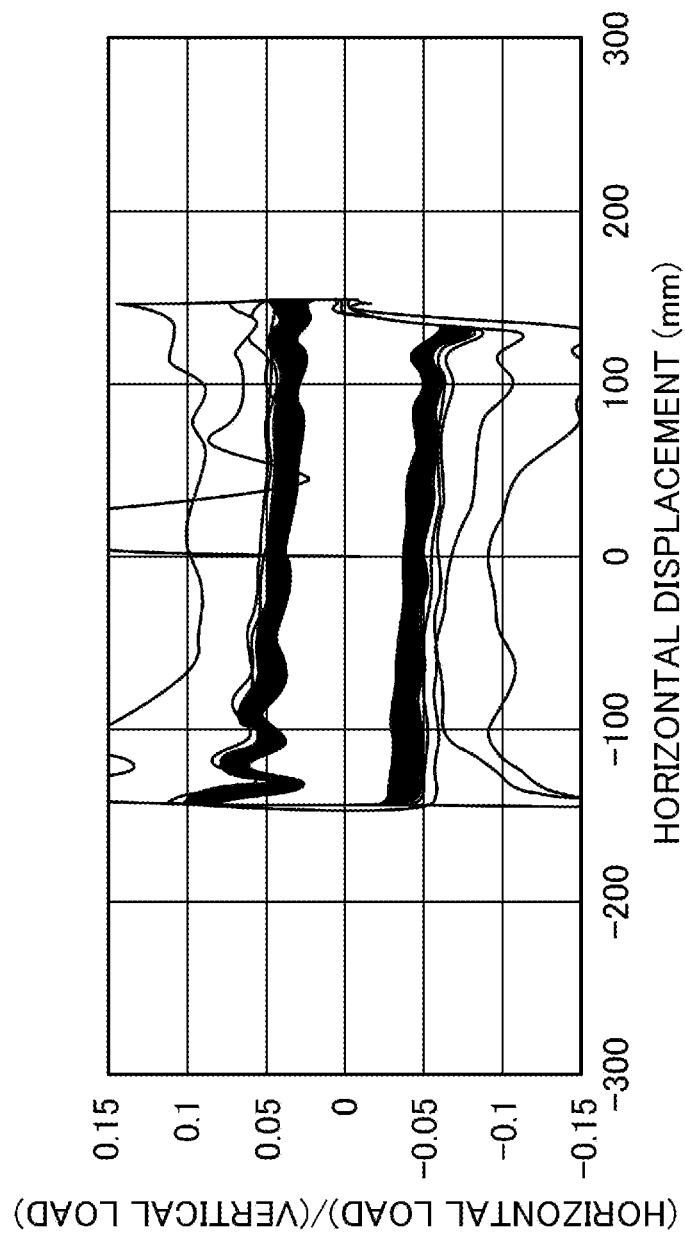
FIG. 7A is a graph illustrating the results of a sliding experiment using a sliding seismic isolation device (flat sliding seismic isolation device) to which a friction member of a double-layered fabric is applied under a bearing stress of 60 MPa.
Figure 7B:
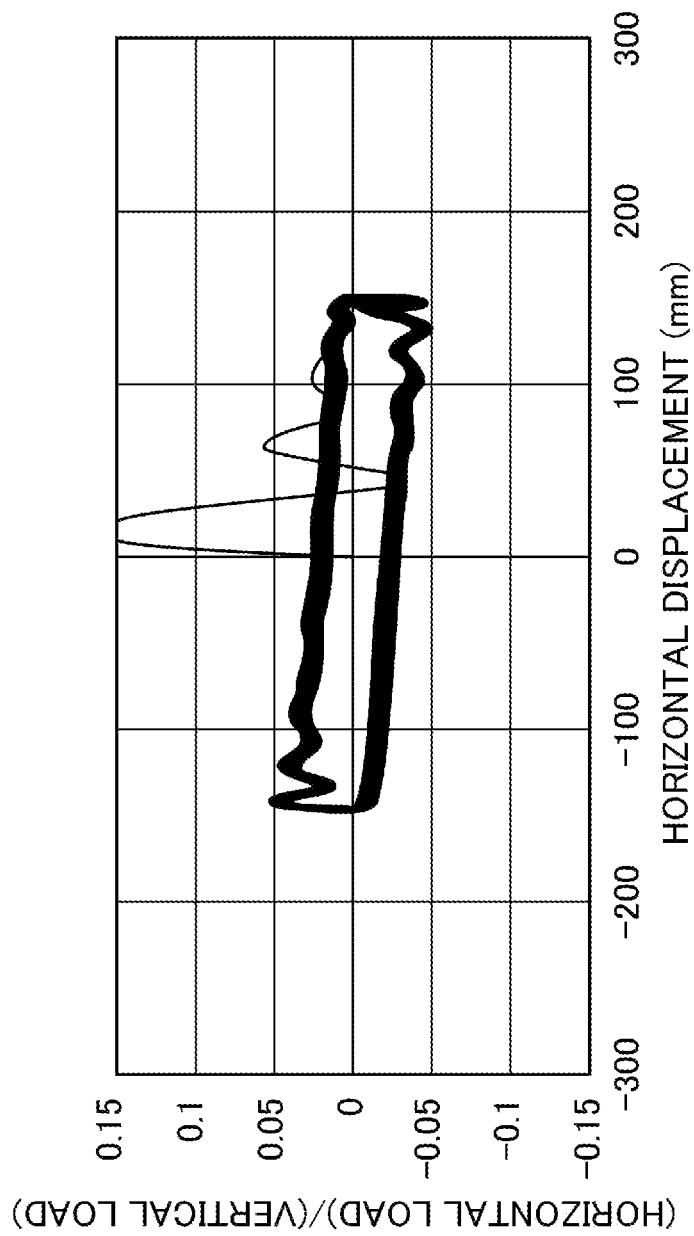
FIG. 7B is a graph illustrating the results of a sliding experiment using a sliding seismic isolation device (flat sliding seismic isolation device) to which a friction member of a single-layer fabric is applied under a bearing stress of 60 MPa.

The experimental results are shown in FIGS. 7A and 7B. Here, FIG. 7A is the experimental results of Comparative Example 2 and FIG. 7B is the experimental results of Example 5.

It is determined from the experimental results that the sliding distance of Comparative Example 2 is 52 m and the sliding distance of Example 5 is 181 m, showing that the sliding distance of Example 5 is more than three times as long as that of Comparative Example 2. These experimental results demonstrate that a sliding seismic isolation device including a friction member composed of a single-layer fabric has good sliding durability under a bearing stress of 60 MPa as well.

Other embodiments where other components are combined with the configurations, etc., illustrated in the above-described embodiment are also possible, and the present disclosure is not limited to the configurations shown herein. In this respect, modifications may be made without departing from the scope of the present disclosure, and may be appropriately determined in accordance with their form of application.

The present international application is based upon and claims priority to Japanese patent application No. 2019-230625, filed on Dec. 20, 2019, the entire contents of which are hereby incorporated herein by reference.

DESCRIPTION OF THE REFERENCE NUMERALS

10: slider
11: slider body
12: upper surface (second sliding surface)
13: lower surface (second sliding surface)
20: superstructure fixation plate (structure fixation plate)
21: lower surface (first sliding surface)
30: substructure fixation plate (structure fixation plate)
31: upper surface (first sliding surface)
40: friction member (single-layer fabric)
41: warp thread (plied yarn)
42: weft thread
43: adhesive
50: structure fixation plate
51: lower surface (first sliding surface)
60: receiving plate
61: base plate
62: cylindrical body
63: concave spherical surface
70: slider
71: lower surface (convex spherical surface)
72: upper surface (second sliding surface)
100: sliding seismic isolation device (sliding seismic isolation device of double-sided sliding bearing)
200: sliding seismic isolation device (sliding seismic isolation device of single-sided sliding bearing)

The invention claimed is:

1. A sliding seismic isolation device comprising:
a structure fixation plate having a first sliding surface;
a metallic slider having a second sliding surface contacting the first sliding surface, and
a friction member composed of a single-layer fabric, the friction member being attached to the first sliding surface, the second sliding surface, or both of the first sliding surface and the second sliding surface on an attachment side of the friction member,
wherein one of a warp and a weft is formed of a plurality of plied yarns into which high-strength fibers and PTFE fibers are twisted together and the other of the warp and the weft is formed of a plurality of high-strength fibers in the single-layer fabric,
the single-layer fabric has a twill weave and is woven such that the plied yarns of the one of the warp and the weft are exposed more than the high-strength fibers of the other of the warp and the weft, at a surface of the friction member opposite from the attachment side of the friction member,
a ratio by weight of the PTFE fibers to the single-layer fabric is 70% or less, and
the high-strength fibers of each of the warp and the weft are liquid crystal polyester fibers.

2. The sliding seismic isolation device as claimed in claim 1, wherein
the sliding seismic isolation device is of double-sided sliding bearing in which
the structure fixation plate includes a superstructure fixation plate and a substructure fixation plate each having the first sliding surface,
the slider has the second sliding surface at each of an upper surface and a lower surface thereof, the second sliding surface of the upper surface and the second sliding surface of the lower surface contacting the first sliding surface on an upper side and the first sliding surface on a lower side, respectively, and
the friction member is attached to the respective first sliding surfaces of the superstructure fixation plate and the substructure fixation plate, the second sliding surfaces of the upper surface and the lower surface of the slider, or both of the first sliding surfaces and the second sliding surfaces.

3. The sliding seismic isolation device as claimed in claim 1, wherein
the sliding seismic isolation device is of single-sided sliding bearing in which
the structure fixation plate has the first sliding surface,
the slider has the second sliding surface contacting the first sliding surface and is held by a receiving plate, and
the friction member is attached to the first sliding surface of the structure fixation plate, the second sliding surface of the slider, or both of the first sliding surface and the second sliding surface.

* * * * *